United States Patent

Wall et al.

[15] 3,701,188
[45] Oct. 31, 1972

[54] HELICALLY FLUTED ROUTER BIT

[72] Inventors: Harry W. Wall, Glendora; Eugene W. Wall, Claremont, both of Calif.

[73] Assignee: Wall Machine Works, El Monte, Calif.

[22] Filed: Jan. 14, 1971

[21] Appl. No.: 106,368

[52] U.S. Cl. ............... 29/103 A, 144/240, 408/26, 408/30, 76/101
[51] Int. Cl. ............................................ B26d 1/12
[58] Field of Search ........... 29/103 A; 144/219, 240; 145/130; 408/26, 30

[56] References Cited

UNITED STATES PATENTS

| 1,907,880 | 5/1933 | Royle | 29/103 A |
| 1,328,430 | 1/1920 | Hathaway | 144/240 |
| 2,718,689 | 9/1955 | Mason et al. | 29/103 A |

Primary Examiner—Leonidas Vlachos
Attorney—Christie, Parker & Hale

[57] ABSTRACT

A router bit has an elongated cylindrical body with a closed helical flute having a concave wall surface merging into a convex wall surface. The width of the flute spans approximately half the circumference of the body, with the flute being formed by a single mill cut from a rotary mill cutter. A recess is formed in the unfluted portion of the body by holding the body against the cutting edge of the rotary grinding wheel and rotating it so the recessed portion forms a substantially cylindrically curved peripheral relief wall encircling the body from one edge to the other of the flute. The relief wall intersects the concave surface of the flute to form a helical cutting edge extending approximately 90° around the circumference of the relief wall.

10 Claims, 6 Drawing Figures

PATENTED OCT 31 1972 3,701,188

INVENTORS
HARRY W. WALL
EUGENE W. WALL
BY
Christie, Parker & Hale
ATTORNEYS

HELICALLY FLUTED ROUTER BIT

BACKGROUND OF THE INVENTION

1. Field of the Invention

This invention relates to tools for routing, and more particularly to a router bit with a closed helical flute.

2. Description of the Prior Art

Router bits are rotary driven cutting tools generally used for milling out grooves and the like from wood, plastic, or metal surfaces, or for flush trimming the edges of panels and the like. A router bit generally has a cylindrical body either with a straight or helical flute formed in its outer surface to form a straight or helical cutting edge, respectively. In an "open flute" router bit, the flute extends to the end of the bit. This type of tool generally is used to "rout out" grooves and the like from a work piece. In a "closed flute" router bit, the flute is formed in an intermediate portion of the bit. This type of tool is generally used in the flush trimming of panels. The closed flute router bit generally has a "pilot head," which is a rounded end portion that does not cut, but provides means for guiding the tool during flush trimming operations.

Prior art router bits with closed helical flutes are generally constructed by milling an elongated helical flute in the outer surface of the body, followed by two or more additional helical mill cuts in the face of the body adjacent to the flute to provide a narrowed area, or "relief area" surrounding the flute. A helical cutting edge is formed at the intersection of the helical flute and the relief area surrounding it. In some instances, the cutting edge must be ground by hand so the edge is sufficiently sharp for routing purposes. It is also common in the prior art to mill out portions of the relief area by hand to smooth out sharp edges and the like remaining after the helical mill cuts. Besides being rather time consuming to make, these prior art router bits generally do not have a design that enables the user to trim a work piece so it produces a smooth finish without burred or uneven edges, and permits flush trimming without chatter or vibration.

SUMMARY OF THE INVENTION

Briefly, this invention provides a router bit having a cylindrical body and a closed helical flute formed in the body. A recess formed in the wall of the unfluted portion of the body encircles the body from one helical edge of the flute to the other to define a cylindrically curved peripheral relief wall which intersects one of the edges of the flute to form a helical cutting edge.

The design of the router bit permits a mill cutter to form the helical flute in one mill cut, with the recessed portion being formed simply by holding the body in a substantially parallel position against the cutting edge of a rotary grinding wheel and rotating it. Thus, the router bit of this invention may be made in substantially fewer steps than prior art router bits.

During use of the router bit, the cylindrically curved relief wall cooperates with the helical cutting edge to produce a smooth trim finish without chatter or vibration.

BRIEF DESCRIPTION OF THE DRAWINGS

The above and other features of the invention are more fully set forth in the following detailed description of the embodiment of the invention which is presently preferred, such description being presented with reference to the accompanying drawings, in which.

DETAILED DESCRIPTION OF THE PREFERRED EMBODIMENT

Figure 1:
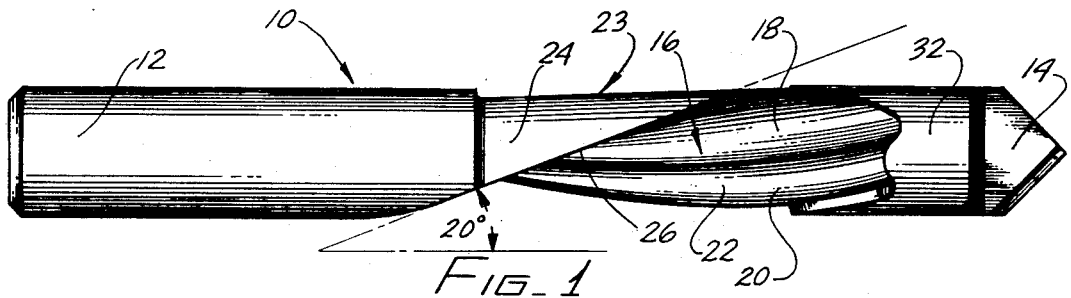
FIG. 1 is a side elevation of a router bit.

Referring to the drawings, a router bit 10 includes a cylindrical body 12 with a pointed end 14 and an elongated helical flute 16 formed in its outer surface. One side of the helical flute has an outer wall surface 18 with a concave upward curvature, and the other side of the helical flute has an outer wall surface 20 with a convex upward curvature. An intermediate wall surface 22 gradually merges with concave wall surface 18 on one side and convex wall surface 20 on the other side.

An elongated recess 23 formed in the unfluted portion of the body defines a substantially cylindrically curved peripheral relief wall 24 extending around the circumference of the body from one helical edge of the flute to the other. Relief wall 24 and the concave wall surface 18 intersect to define a helical cutting edge 26 at one edge of the flute. Cutting edge 26 extends approximately 90° around the circumference of the relief wall.

Figure 4:
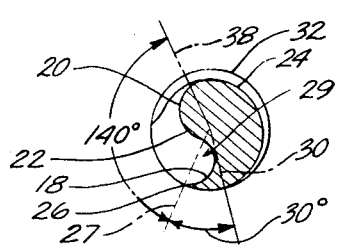
FIG. 4 is a sectional elevation taken on line 4—4 of FIG. 3.

As shown best in FIG. 4, when the router bit is viewed in transverse cross-section, a radial line 27 (shown in phantom line) may be drawn from the centerline of the body 12 outwardly through helical cutting edge 26. The opposite helical edge of the flute 16 lies on a radial line 28 (shown in phantom line) extending outwardly from the centerline of the body. The width of the flute, measured from line 27 to line 28, traverses approximately 140° of the circumference of relief wall 24. The radius of relief wall 24 at cutting edge 26 (measured at radial line 27) is substantially equal to the radius of the body. The radius of the relief wall gradually tapers narrower around the body and reaches a minimum at the opposite edge of the flute, where it measures approximately 85 percent the width of the radius of the body. The radius of relief wall 24, when measured at any angle relative to the radial line 27, is substantially constant along the length of the recessed portion of the body.

The radius of the concave wall surface 18 of the flute is slightly less than the radius of the convex wall surface 20. Thus, concave wall surface 18 traverses the radial line 27 at a point close to the centerline of the body to define with radial line 27 a hollowed D-shaped area 29 in the flute adjacent to cutting edge 26. The concave wall surface 18 defines with relief wall 24 an acute angle along cutting edge 26. The concave wall surface 18 which hooks away from radial line 27 to form the hollowed area 29 is said to have a "positive rake angle," the purpose of which is described in detail below. The rake angle of the router bit 10 is approximately 30° when measured between the radial line 27 and a radial line 30 tangent to the inward-most projection of concave wall surface 18.

As shown best in FIG. 1, cutting edge 26 has a pitch angle of about 20° relative to the horizontal plane.

Figure 2:
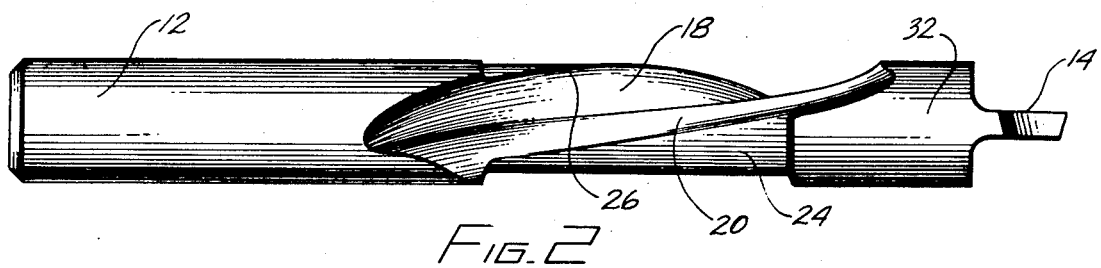
FIG. 2 is a side elevation of the router bit of FIG. 1 rotated approximately 90° clockwise as viewed from the right end of the bit.
Figure 3:
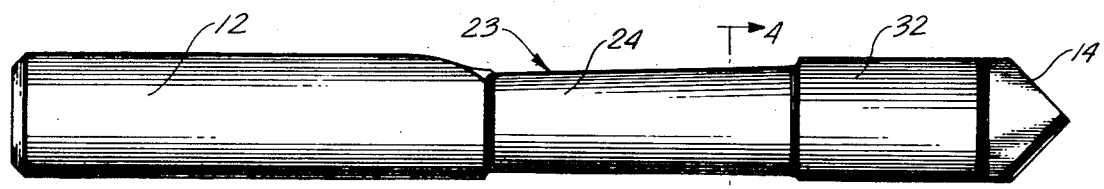
FIG. 3 is a side elevation of the router bit of FIG. 2 rotated approximately 90° clockwise when viewed from the right end of the bit.

The portion of body 12 between the pointed end 14 and the right edge of relief wall 24 (as viewed in FIGS. 1–3) defines a cylindrically curved pilot head portion 32. In use, the pilot head is used for guiding the router bit during conventional flush trimming operations. The fluted portion of the pilot head does not cut the work piece being trimmed, because the pilot head does not have a recessed relief wall portion, such as peripheral relief wall 24.

Figure 5:
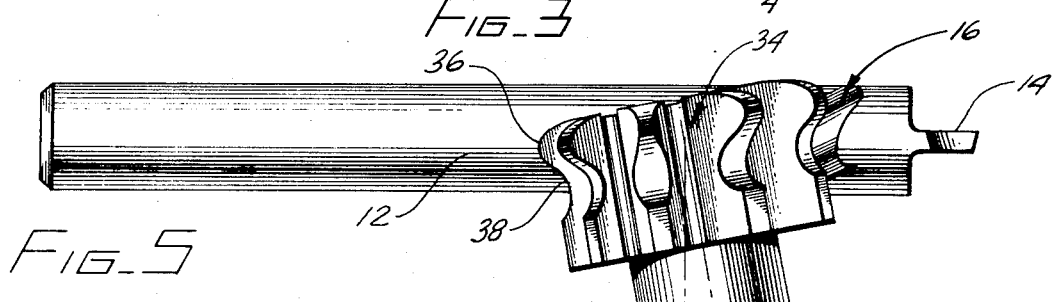
FIG. 5 shows a rotary mill cutter forming the helical flute.

The preferred method of constructing router bit 10 is to first cut elongated pieces of cylindrical bar stock into segments or bodies having the desired length of the router bit. A straddle mill cut is then made at one end of each body to form pointed end 14 of the bit. The body 12 is then mounted in a fixed position in a milling machine, and a rotary mill cutter is placed in contact with the cylindrical outer wall surface of the body. As shown best in FIG. 5, the rotary axis of the mill cutter preferably is held at an angle of 10° relative to a line normal to the longitudinal axis of the body. The milling machine moves the body linearly relative to the mill cutter, and at the same time the body is rotated about its axis. The rate of rotation of the body is related to its linear movement such that high speed rotation of the mill cutter forms a helical flute of the desired pitch angle in the outer surface of the body. Mill cutter 34 has a convex cutting surface 36 which forms concave wall surface 18 of the flute and a concave cutting edge 38 which forms the convex portion 20 of the flute. The length of the mill cut is preferably controlled by a rotary dividing head in the milling machine. The ratio of linear movement to rotation of the body is held constant while the flute is being formed, and the helical mill cut, from end to end, is formed during 112.5° of rotation of the body.

Figure 6:
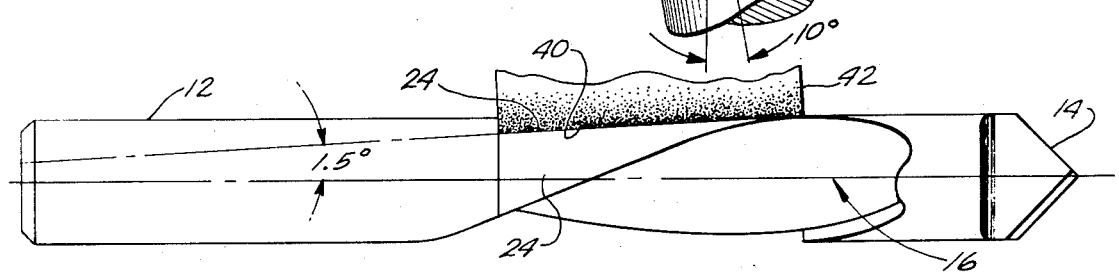
FIG. 6 shows a rotary grinding wheel forming the peripheral relief wall surface.

As shown best in FIG. 6, the relief wall 24 is preferably formed by moving the body directly into contact with a transversely flat cylindrically curved cutting edge 40 of a rotary grinding wheel 42. The body is rotated about its axis as it is held in contact with cutting edge 40 so the relief wall extends from one edge of helical flute 16 to the other. In practice, the desired width of the relief wall 24 and the pitch angle of the helix are such that if the body is held exactly parallel to cutting edge 40 during grinding operations, the grinding edge would reach far enough around the body to grind off a portion of cutting edge 26 when the portion of relief wall 24 adjacent the opposite helical edge of the flute is being ground. Therefore, the body is held at an angle of 1.5° relative to grinding edge 40 to prevent the grinding edge from coming into contact with cutting edge 26 during grinding operations. Relief wall 24 extends approximately 310° around the circumference of body 12.

Thus, the router bit 10 is produced by simply making a single mill cut to form the helical flute, with the relief wall surrounding the flute being formed by a single mill cut with a rotary grinding wheel. This is a substantial time-saving improvement in the method of making router bits with closed helical flutes. The prior art router bits generally are made with a plurality of time consuming helical mill cuts to form the helical flute and relief area surrounding it. Rough edges and the like, which usually remain after such milling operations, generally are taken off by free-hand grinding operations.

Router bit 10 is preferably made of a high speed tool steel material, with the machining operations for forming flute 16 and relief wall 24 being performed when the material is in a relatively soft condition. After the flute and relief wall are machined, the steel router bit is hardened by heat treatment to improve its service characteristics.

In use, when router bit 10 is rotated at high speeds to flush trim wood, plastic, or relatively soft metal workpieces, cutting edge 26 produces a smooth cut which provides a completely clean finish line with no burred or uneven edges. The smooth cutting provided by the router bit also permits the operator to flush trim workpieces faster than with prior art router bits, while at the same time experiencing no chatter or undue vibration common with prior art router bits. For example, prior art router bits were tested by flush trimming wood veneer sheets in a direction perpendicular to the grain of the wood. None of the prior art router bits produced a clean cut free from splintered edges. In the same test the present router bit produces a completely clean cut even when the speed of the cutting is substantially increased.

It is believed that the smoother, cleaner, and faster cutting obtained by the present router bit is the result of the helical cutting edge 26 merging with the cylindrically curved relief wall 24 which has a substantially constant radius of curvature both for its entire length and from the cutting edge 26 around to the opposite edge of helical flute 16. Some prior art cutting edges merge with a flat relief wall which is formed by "flat grinding" the metal adjacent the cutting edge in a direction parallel to the width of the grinding edge of a rotary grinding wheel. The flat ground relief wall does not produce the smooth cutting obtained by the cylindrically curved relief wall of this invention. Furthermore, it is substantially more time-consuming to mill properly than the cylindrical relief wall. In other instances, prior art cutting edges merge with a "hollow ground" relief area, in which material is scooped out from around the helical flute by a plurality of helical grinds in a direction parallel to the grinding edge of a rotary grinding wheel to produce a relief area with a concave upward curvature substantially parallel to the length of the router bit. These router bits do not produce smooth cutting because the concave relief wall surface produces too much vibration during use. Moreover, these router bits have a substantially greater amount of material removed from the relief area surrounding the helical flute than does the present router bit. As a result, the present router bit runs substantially cooler than the prior art bits because there is more stock present in the relief area to absorb the heat produced during cutting operations.

In some prior art router bits, the concave helical flute has a negative rake angle. That is, when viewed in transverse crosstsection, the concave wall surface of the flute does not hook back far enough from the helical cutting edge to transverse a radial line, such as radial line 27, extending from the centerline of the bit to the cutting edge. During flush trimming operations, such a flute design merely rubs against the material to be trimmed and produces a rough cut. The concave wall surface 18 of the present router bit has a positive rake angle with a sharp cutting edge that permits smooth and rapid cutting of the workpiece.

In some instances, prior art router bits have a relatively narrow concave flute, with a relatively sharp helical edge surface opposite the helical cutting edge. With this design, during flush trimming of soft metals such as aluminum and laminates such as resin-bonded plywood, a deposit of chips builds up in the narrow helical flute. Because of the failure of chips to flow out of the narrow flute, the cutting ability of the cutting edge is reduced and the router bit has a tendency to vibrate and chatter so much that it is extremely difficult to make a smooth, straight cut. In the present router bit the gradual curvature of the wall surface 22 and convex wall surface 20 permits chips to flow out of the helical flute as the tool cuts, thereby maintaining a clean cutting edge during flush trimming operations.

We claim:

1. A router bit which includes a cylindrical body; a closed helical flute formed in the wall of the body, the flute defining a pair of substantially parallel, longitudinally extending helical edges; and a recess formed in the unfluted portion of the body and extending from one edge of the flute around the body to the other edge of the flute to form a substantially cylindrically curved closed peripheral relief wall, the flute having a concave wall surface intersecting the peripheral relief wall to form one of said helical cutting edges of the flute, and a convex wall surface which intersects the peripheral relief wall to form the other edge of the flute, the concave and convex wall surfaces forming a gradual merger at an intermediate portion of the flute.

2. Apparatus according to claim 1 in which the helical cutting edge has a substantially 20° pitch angle relative to the horizontal plane when the cylindrical body is disposed in a horizontal plane.

3. Apparatus according to claim 1 wherein the concave wall surface extends inwardly in the body such that a portion of the wall surface, when the body is viewed in transverse cross section, traverses a radial line extending from the centerline of the body to the helical cutting edge so the cutting edge forms an acute angle relative to the peripheral relief wall.

4. Apparatus according to claim 3 wherein the width of the concave portion is slightly less than the width of the convex portion so the wall surface of the concave portion traverses the radial line at a point close to the centerline of the body.

5. Apparatus according to claim 1 wherein the angle of the helical flute is such that the cutting edge formed by it extends approximately 90° around the circumference of the peripheral relief wall surface.

6. Apparatus according to claim 1 wherein the angle of the helical flute and the width of the flute between the opposite edges thereof are such that at least a portion of the relief wall surface extends around substantially the entire circumference of the body.

7. Apparatus according to claim 1 wherein the width of the helical flute is such that it reaches approximately half way around the circumference of the body.

8. A router bit which includes a cylindrical body; a substantially cylindrically curved peripheral relief wall formed in a portion of the body; and a helical flute formed in the body, the flute having a concave wall surface intersecting the peripheral relief wall to form a helical cutting edge of the flute, and a convex wall surface which intersects the peripheral relief wall to form an opposite edge of the helical flute, the concave and convex wall surfaces forming a gradual merger at an intermediate portion of the flute.

9. Apparatus according to claim 8 wherein the concave wall surface extends inwardly in the body such that a portion of the wall surface, when the body is viewed in transverse cross-section, traverses a radial line extending from the centerline of the body to the helical cutting edge so the cutting edge forms an acute angle relative to the peripheral relief wall.

10. Apparatus according to claim 9 wherein the width of the concave portion of the flute is slightly less than the width of the convex portion of the flute so the wall surface of the concave portion traverses the radial line at a point close to the centerline of the body.

* * * * *

7207:WGM

PO-1050
(5/69)

UNITED STATES PATENT OFFICE
CERTIFICATE OF CORRECTION

Patent No. 3,701,188          Dated October 31, 1972

Inventor(s)     HARRY W. WALL and EUGENE W. WALL

It is certified that error appears in the above-identified patent and that said Letters Patent are hereby corrected as shown below:

Front Page, Item [73], "El Monte" should read --South El Monte--.

Col. 5, Line 3, Change "crosstsection" to --cross-section--;

Col. 5, Line 5, Change "transverse" to --traverse--.

Signed and sealed this 1st day of May 1973.

(SEAL)
Attest:

EDWARD M. FLETCHER, JR.              ROBERT GOTTSCHALK
Attesting Officer                       Commissioner of Patents